(12) United States Patent
Nakao et al.

(10) Patent No.: US 7,072,191 B2
(45) Date of Patent: Jul. 4, 2006

(54) SWITCHING POWER SOURCE CIRCUIT FOR INDEPENDENT PER CYCLE CONTROL OF ON/OFF TIME RATIO

(75) Inventors: Fumiaki Nakao, Shizuoka (JP); Tetsuya Suzuki, Aichi (JP); Yasuo Yamashita, Shizuoka (JP); Kazuo Takehara, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/973,922

(22) Filed: Oct. 26, 2004

(65) Prior Publication Data

US 2005/0094420 A1 May 5, 2005

Related U.S. Application Data

(63) Continuation of application No. PCT/JP03/05194, filed on Apr. 23, 2003.

(30) Foreign Application Priority Data

Apr. 26, 2002 (JP) .............................. 2002-126900

(51) Int. Cl.
*H02M 3/335* (2006.01)
*G04F 1/40* (2006.01)

(52) U.S. Cl. .................... 363/21.1; 363/21.18; 323/282

(58) Field of Classification Search .............. 363/21.1, 363/21.04, 21.12, 21.18, 21.17; 323/282
See application file for complete search history.

(56) References Cited

U.S. PATENT DOCUMENTS

| | | | |
|---|---|---|---|
| 4,849,869 A * | 7/1989 | Tanuma et al. ........... | 363/21.13 |
| 5,278,490 A * | 1/1994 | Smedley ..................... | 323/284 |
| 5,301,095 A * | 4/1994 | Teramoto et al. ......... | 363/21.07 |
| 5,657,211 A * | 8/1997 | Brockmann ................ | 363/16 |
| 5,793,621 A * | 8/1998 | Yamada ..................... | 315/411 |
| 5,828,558 A * | 10/1998 | Korcharz et al. .......... | 363/20 |
| 5,835,361 A * | 11/1998 | Fitzgerald ................. | 363/21.03 |
| 6,249,108 B1 * | 6/2001 | Smedley et al. ........... | 323/207 |
| 6,297,980 B1 * | 10/2001 | Smedley et al. ........... | 363/89 |
| 6,341,075 B1 * | 1/2002 | Yasumura ................. | 363/21.02 |
| 6,545,887 B1 * | 4/2003 | Smedley et al. ........... | 363/89 |
| 6,603,671 B1 * | 8/2003 | Tokunaga et al. .......... | 363/17 |
| 6,781,352 B1 * | 8/2004 | Athari et al. ............... | 323/222 |

FOREIGN PATENT DOCUMENTS

| | | |
|---|---|---|
| JP | 52-132662 | 11/1977 |
| JP | 63-4186 | 1/1988 |
| JP | 06-233148 | 8/1994 |
| JP | 09-298872 | 11/1997 |
| JP | 2002-308335 | 11/2000 |
| JP | 2002-051551 | 2/2002 |

* cited by examiner

OTHER PUBLICATIONS

International Search Report for PCT/JP03/05194; ISA/JP; Mailed: Aug. 5, 2003.

*Primary Examiner*—Bao Q. Vu
(74) *Attorney, Agent, or Firm*—Harness, Dickey & Pierce, PLC

(57) ABSTRACT

A switching power supply circuit, which can respond to a rapid and large change in a load quickly and stably and ensure a power supply output having a predetermined voltage, is provided. In the power supply circuit which supplies an input current to a load while switching the input current periodically and controls an output voltage Vo supplied to the load to a predetermined target value by controlling an ON/OFF time ratio (t1/t2) of the switching variably, a control of the ON/OFF time ratio is performed for every one current supply cycle T independently.

16 Claims, 10 Drawing Sheets

SWITCHING POWER SOURCE CIRCUIT FOR INDEPENDENT PER CYCLE CONTROL OF ON/OFF TIME RATIO

CROSS-REFERENCE TO RELATED APPLICATIONS

This application is a continuation of the International Application No. PCT/JP03/05194 filed on Apr. 23, 2003 designating the United States of America.

BACKGROUND OF THE INVENTION

1. Field of the Invention

The present invention relates to a switching power supply circuit, and more particularly to a switching power source circuit which is effectively applied to, for example, a voltage stabilizing power supply, a DC voltage converter and the like.

2. Description of the Related Art

A switching power supply circuit supplies an input current to a load while switching the input current periodically, and variably controls an ON/OFF time ratio of the switching, whereby the switching power supply circuit controls an output voltage supplied to the load to a predetermined target value. In recent years, this switching power supply circuit has come to be widely used for a local power supply for use in a CPU of a personal computer, a very-small-scale DC/DC converter for use in a portable device and the like.

FIGS. 10A and 10B illustrate an example of a conventional switching power supply circuit. Respectively, FIG. 10A illustrates a circuit diagram of a principal part thereof, and FIG. 10B illustrates a waveform chart of an operation thereof.

The switching power supply circuit illustrated in FIG. 10A is constituted with use of a power MOS transistor Q1 as a switching element; a high frequency power transformer 10; diodes D1 and D2; a choke coil L3; a voltage comparison circuit 21; an LPF (low pass filter) 22; a PWM (pulse width modulation) circuit 23; a clock generator 25; and the like.

In the above described circuit, the transistor Q1 is interposed in series between an input power supply of a voltage Vi and a primary coil L1 of the transformer 10, and switches an input current flowing into the primary coil L1. Thus, a switching output current appearing at a secondary coil L2 of the transformer 10 is rectified by the diode D1, and thereafter is supplied to a load via the choke coil L3. The load has a capacitance Cx and a resistance Rx equivalently, and forms a time constant of a smoothing circuit together with the choke coil L3.

An output voltage Vo supplied to the load is compared with a predetermined reference voltage Vr by the voltage comparison circuit 21. Since ripples are contained in a comparison output voltage from the comparison circuit 21, the comparison output voltage is converted to a DC voltage by the LPF 22. The LPF 22 averages the comparison output voltage on a time axis so that the comparison output voltage has a sufficiently large time constant relative to a cycle of the ripple, that is, a switching cycle of the transistor Q1.

The comparison output voltage which has been converted to the DC voltage by the LPF 22 is supplied to the PWM circuit 23 as a pulse width control signal Vm. The PWM circuit 23 operates in synchronization with clocks φ, and generates pulse signals Vp having a constant cycle T to allow the transistor Q1 to perform a switching operation. A pulse width of the pulse signals Vp, that is, an ON/OFF time ratio (t1/t2) of the switching is feedback-controlled by the pulse width control signal Vm.

In other words, the foregoing switching power supply circuit detects a difference between the output voltage Vo as a control value and the reference voltage Vr as a target value, that is, a time average value of a control error, and converges the output voltage Vo to the reference voltage Vr by a feedback control loop which makes the time average value zero. The foregoing switching power supply circuit presents no problem especially if a change in the load is comparatively slow. When a load current changes rapidly and greatly like, for example, a local power supply for use in a CPU of a personal computer, the foregoing feedback control loop can not sufficiently follow the change in the load, and a so-called response delay and an excessive response occur. As means for compensating an inadequacy in this response characteristic, a contrivance in which a large-capacity smoothing capacitor (capacitor element) is inserted in parallel with an output line is adopted frequently. However, in order to adopt such contrivance, a large-scale capacitor having a capacity large enough to fully absorb the change in the load current is required, and this contrivance is not fundamental problem-solving means. For example, though a recent high-speed CPU is designed to consume a large current with a low voltage, there is a problem in that the smoothing capacitor alone is allowed to absorb a current change in a low impedance load as described above. On the other hand, when a response speed is increased to cope with the rapid change of the load in the foregoing conventional switching power supply circuit, a problem occurs in which a loop operation of the feedback control becomes unstable and troubles such as oscillation are apt to occur.

SUMMARY OF THE INVENTION

The present invention was made in view of the above-described problems, and one of objects of the present invention is to provide a switching power supply circuit capable of responding to a rapid and large change in the load quickly and stably and ensuring a power supply output having a predetermined voltage.

To achieve the above-described object and other objects, one aspect of the present invention is a switching power supply circuit which supplies an input current to a load while switching the input current periodically, and controls an output voltage supplied to the load to a predetermined target value by variably controlling an ON/OFF time ratio of the switching. The switching power supply circuit performs the control of the ON/OFF time ratio for every one current supply cycle independently.

Furthermore, another aspect of the present invention is a semiconductor circuit device constituting a principal part of the foregoing switching power supply circuit. In this case, a switching element for periodically switching an input current and at least a part of the control circuit for controlling the ON/OFF time ratio of this switching element for every current supply cycle independently are integrally formed on the single semiconductor substrate.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1A:
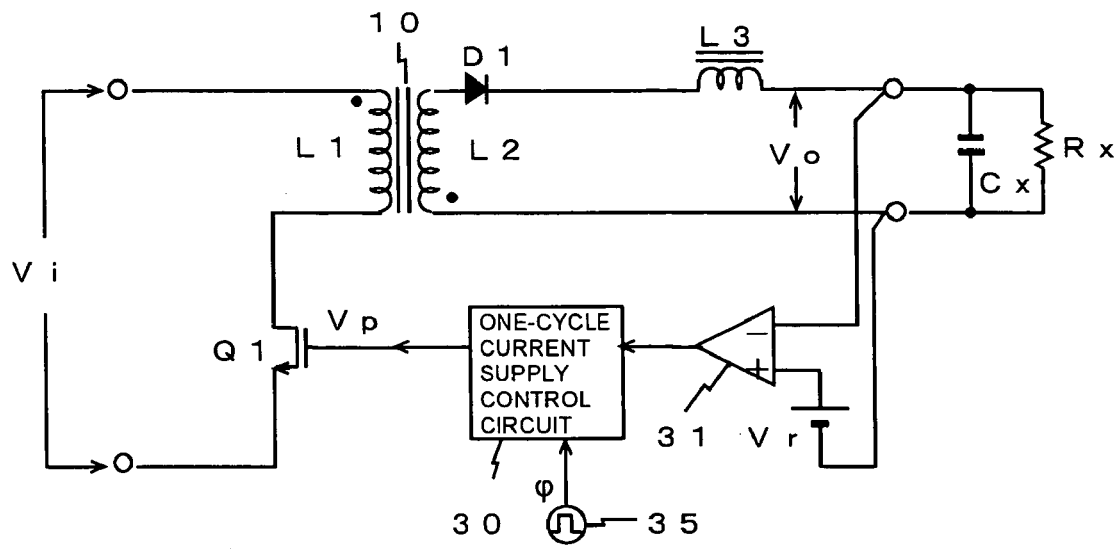
FIGS. 1A and 1B are a circuit diagram illustrating a first embodiment of a switching power supply circuit according to the present invention and a flowchart of an operation of the same.

At least the following matters will be made clear by the explanation in the present specification with reference to the accompanying drawings.

One aspect of the present invention is a switching power supply circuit which supplies an input current to a load while switching the input current periodically, and controls an output voltage supplied to the load to a predetermined target value by variably controlling an ON/OFF time ratio of the switching. The switching power supply circuit performs the control of the ON/OFF time ratio for every one current supply cycle independently. Thus, the switching power supply source can respond to the rapid and large change in the load quickly and stably, and can ensure a power supply output having a predetermined voltage.

In the above configuration, specifically, the control of the ON/OFF time ratio is performed based on a control error immediately before an ON start. In order to control the ON/OFF time ratio, a control error detected for an OFF period of the switching is integrated and an ON period after the OFF period may be variably set based on an integration result. Furthermore, a single pulse with-variable-width generator, which generates a pulse signal for every current supply time and set a pulse width of the generated pulse signal variably depending on the voltage, may be used. Alternatively, in a system performing a power transmission toward an output side for a period when a main switch is turned on, as in the case of a forward converter, a back converter and the like, a period when a control value exceeds a target value is integrated, and a time when an integration value reaches a predetermined level is determined as an end timing of an ON period of the switching. Also with such system, the ON period of the switching can be variably set in accordance with the control error.

Otherwise, the following aspect may be adopted. Specifically, a single pulse generating circuit is used which is triggered every time an output voltage that is a control value falls below a predetermined reference voltage and generates a pulse signal with a predetermined pulse width, and thereby the switching operation is performed by the pulse signal generated by this single pulse generating circuit. This aspect is advantageous in terms of simplification of the configuration.

With respect to the system of the foregoing switching power supply circuit, a circuit system can be realized, in which switching is made as to an input current flowing into a primary coil of a transformer, and thereby a switching output current appearing at a secondary coil of the transformer is rectified and smoothened to be supplied to a load. In this case, a high frequency transformer can be used as the transformer.

Furthermore, a circuit system can also be adopted, which accumulates an input current supplied to a coil therein at the time of switching-on of the switching, and by rectifying an inertial current flowing through the coil at the time of an OFF time of the switching and charging it in a capacitor, takes out an output voltage from the capacitor. In this case, an ON period of the switching may be variably set based on a control error detected at the time when output voltage falls below a predetermined reference voltage for an OFF period thereof immediately before the ON period thereof.

The switching can be performed with use of any of a MOS transistor and a bipolar transistor. When the MOS transistor is used, it is possible to lessen voltage loss due to the switching. Since the bipolar transistor uses both of electrons with positive charge and holes with negative charge as carriers carrying a current, an operation of the circuit using the bipolar transistor is generally performed at a high speed compared to the MOS transistor using any of the electrons and the holes, and the bipolar transistor is suitable for high-speed switching.

A part or entire of a control circuit which variably sets the ON/OFF time ratio of the foregoing switching can be integrally fabricated on a single semiconductor substrate together with active elements performing the switching. Accordingly, the present invention can be directed to a semiconductor circuit device constituting a principal part of the foregoing switching power supply circuit. In this case, a switching element for periodically switching an input current and at least a part of the control circuit for controlling the ON/OFF time ratio of this switching element for every current supply cycle independently are integrally formed on the single semiconductor substrate. As the switching element, a power MOS transistor or a power bipolar transistor is formed.

A concrete embodiment of the present invention will be described below.

Figure 1B:
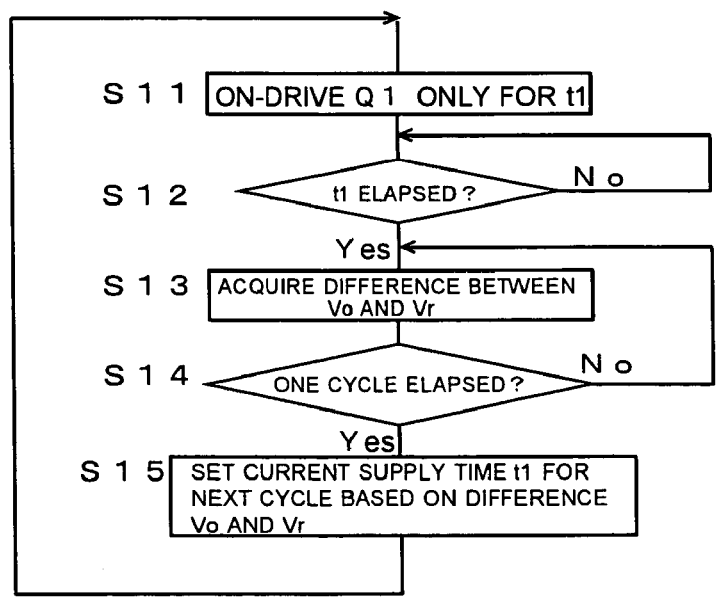
Figure 2:
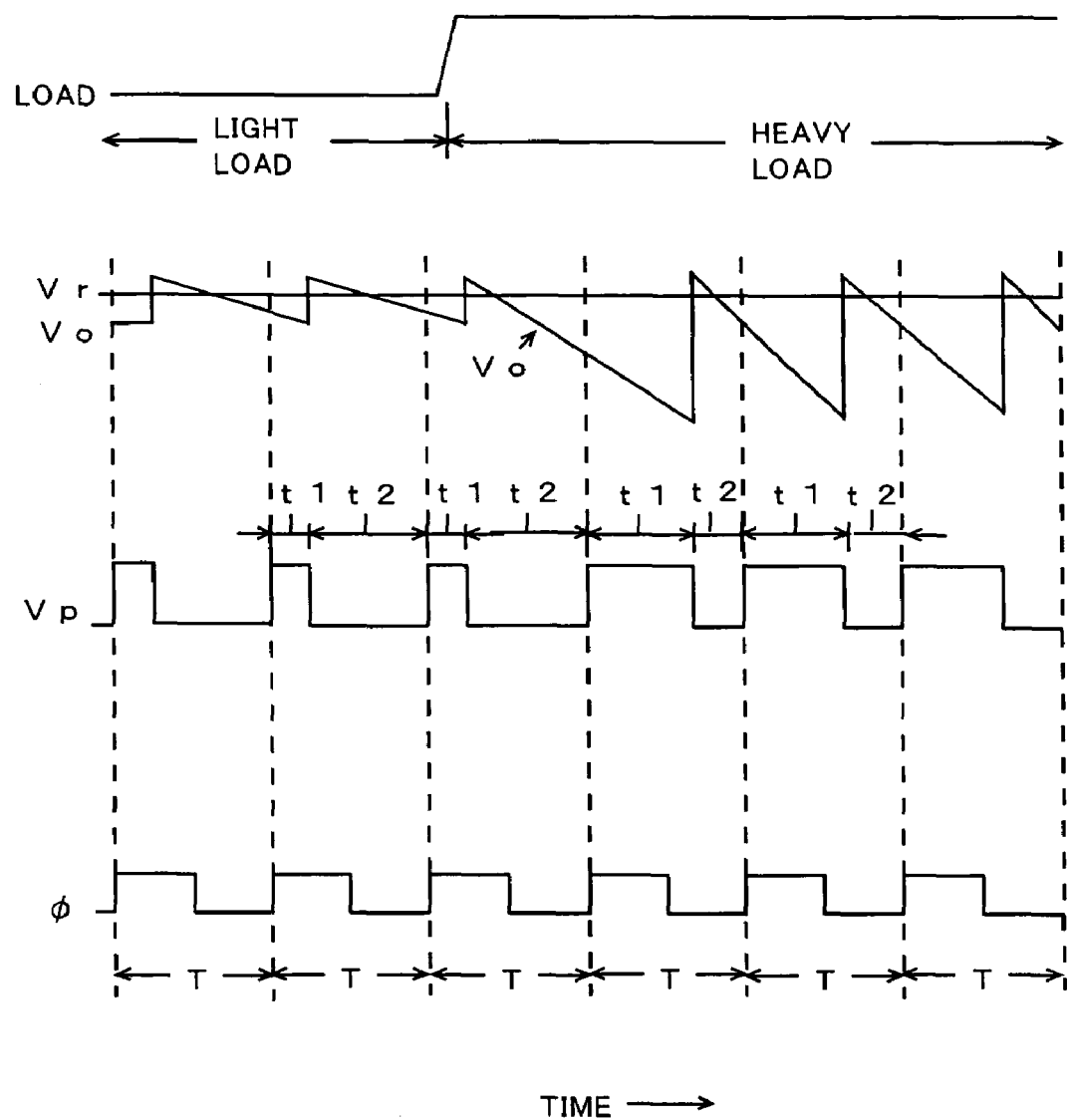
FIG. 2 is a waveform chart illustrating an operation in a principal part of the switching power supply circuit of FIG. 1A.

FIGS. 1A and 1B illustrate a first embodiment of a switching power supply circuit according to the present invention. FIG. 1A shows a circuit diagram of a principal part of the switching power supply circuit, and FIG. 1B shows a flow chart illustrating an operation of the principal part thereof. FIG. 2 shows a waveform chart illustrating an operation in the principal part of the circuit of FIG. 1A.

The switching power supply circuit illustrated in the figures is constituted with use of a power MOS transistor Q1 as a switching element, a high frequency power transformer 10, a diode D1, a choke coil L3, a one-cycle current supply control circuit 30 serving also as a driving circuit for the switching element, a voltage comparison circuit 31, a clock generator 35, and the like as shown in FIG. 1A. In this case, the choke coil L3 is equivalently formed by an inductance which is not coupled to a power transformer, and an inductance distributed or parasitized on a current line or the like.

In the above-described circuit, the transistor Q1 is interposed in series between an input power supply of a voltage Vi and a primary coil L1 of the transformer 10, and is switches an input current flowing into the primary coil L1. Thus, a switching output current appearing at a secondary coil L2 of the transformer 10 is rectified by the diode D1, and thereafter is supplied to a load via the choke coil L3. The load has a capacitance Cx and a resistance Rx equivalently, and forms a time constant of a smoothing circuit together with the choke coil L3.

An output voltage Vo to be supplied to the load is compared with a predetermined reference voltage Vr in the voltage comparison circuit 31. The comparison output of the comparison circuit 31 is inputted to the one-cycle current supply control circuit 30 as control information. The one-cycle current supply control circuit 30 is constituted so as to execute an operation sequence (Steps S11 to S15) shown in FIG. 1B.

Specifically, the one-cycle current supply control circuit 30 generates a pulse signal Vp for every one-cycle of a clock φ, and turns on the foregoing power MOS transistor Q1 for a period of a pulse width of the pulse signal Vp (S11). The transistor Q1 supplies the input current to the primary coil L1 for a time t1 equivalent to the pulse width of the pulse signal Vp. When the transistor Q1 is turned off after the current supply time t1 has elapsed, a difference between the output voltage Vo and the reference voltage Vr, that is, a control error is acquired in a turning-off time t2 of the transistor Q1 (S12 to S14). This control error is detected by the foregoing voltage comparison circuit 31. A pulse width in a next clock cycle (current supply cycle T) is newly set based on the control error (S15). Then, in the next clock cycle, a pulse signal Vp having the newly set pulse width is generated, and the foregoing transistor Q1 is turned on to be driven (S11). Thus, the current supply time t1 based on the immediately preceding control error alone is set for every clock cycle. Each current supply time t1 is variably set in a direction where the control error is reduced respectively.

The switching power supply circuit of the foregoing embodiment is the same as the foregoing conventional circuit in that the switching power supply circuit supplies the input current to the load while periodically switching the input current in synchronization with the clock φ, and variably controls the ON/OFF time ratio (t1/t2) of the switching. However, the switching power supply circuit of the foregoing embodiment differs from the foregoing conventional circuit in that the switching power supply circuit controls the ON/OFF time ratio (t1/t2) for every one current supply cycle T independently.

Specifically, in the conventional circuit, the feedback control loop which zeros the detected and averaged value of the control errors through a plurality of current supply cycles T is formed, as described above. In this case, a time average value of the control errors for the previous plurality of current supply cycles is reflected on the ON/OFF time ratio (t1/t2) for each of the respective current supply cycles T. Accordingly, even if the control error due to the change in the load occurs, a considerable delay occurs until the control error is feedbacked. Therefore, the foregoing feedback control loop can not follow rapidly the rapid change in the load, and a so-called response delay occurs. In order to compensate the response delay, in the conventional feedback control loop, a feedback gain (loop gain) of the control error is made large, or a phase compensation to emphasize the variation of the control error is performed. However, these bring about the instability of an operation due to an excessive response, and may cause the conventional circuit to fall into an abnormal operation such as oscillation at worst.

On the contrary, in the above-described circuit of the present invention, when the control error due to the change in the load occurs, the control error is instantly feedbacked to the pulse current supply time t1 immediately after the occurrence of the control error without waiting for being averaged for the plurality of current supply cycles as illustrated in FIG. 2. Thus, the circuit of the present invention can respond to the rapid and large change in the load quickly and stably, and can ensure a power supply output having a predetermined voltage. The current supply time t1 in this case is set independently for every one current supply cycle T. The current supply time t1 in each current supply cycle T is respectively set depending on the control error alone immediately before the current supply. Thus, it is possible to control the output voltage to the target value quickly and stably without accompanying the response delay and the excessive response.

Figure 3A:
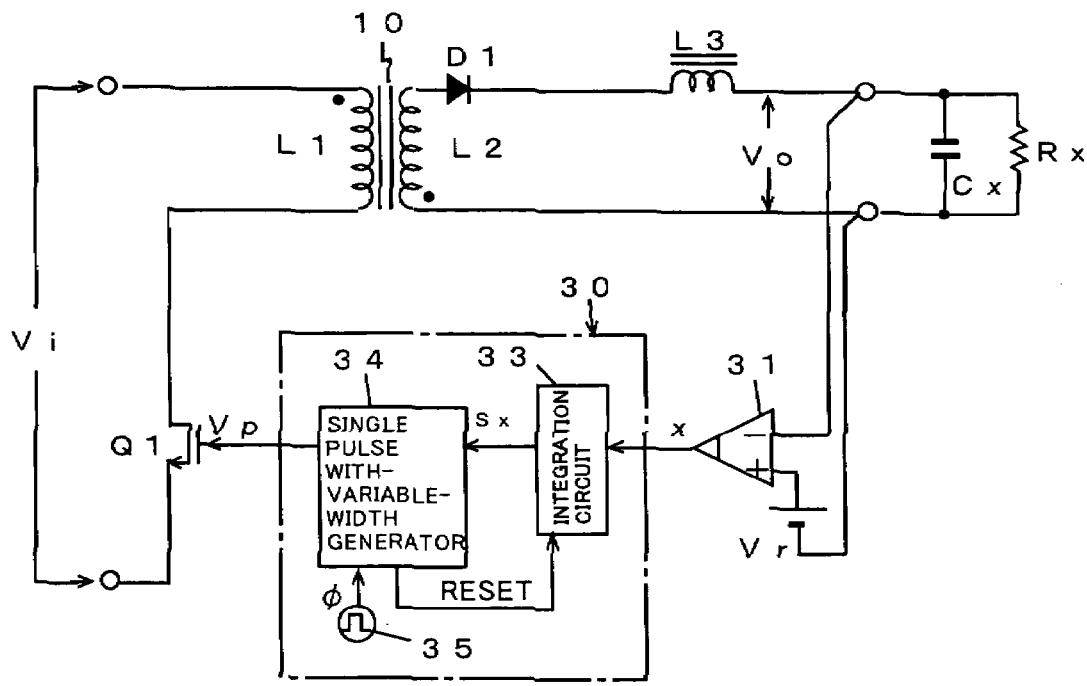
FIGS. 3A and 3B are a circuit diagram illustrating a second embodiment of the switching power supply circuit according to the present invention and a waveform chart of an operation of the same.
Figure 3B:
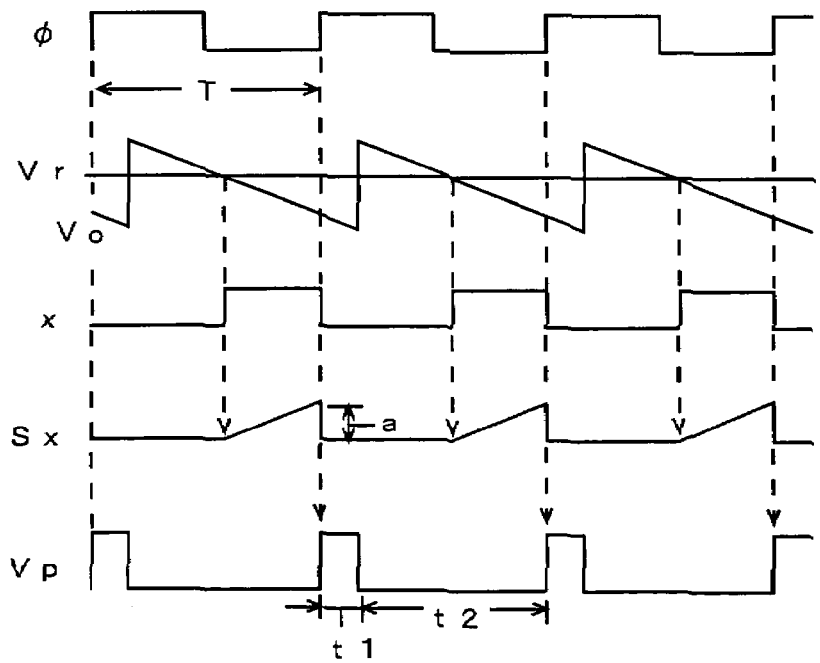

FIG. 3A show a second embodiment of the switching power supply circuit according to the present invention. FIG. 3A shows a circuit diagram of a principal part thereof, and FIG. 3B shows a waveform chart of an operation thereof.

This second embodiment is a more specified example of the foregoing first embodiment, and an integration circuit 33 and a single pulse with-variable-width generator 34 are used in order to constitute the foregoing one-cycle current supply control circuit 30.

The voltage comparison circuit 31 for detecting a control error outputs a difference between an output voltage Vo and a reference voltage Vr in the form of a binary logic level of high and low levels. Specifically, when the output voltage Vo, that is, a control value, falls below the reference voltage Vr, that is, a target value, the voltage comparison circuit 31 outputs an active level of high. When the output voltage Vo exceeds the reference voltage Vr, the comparison circuit 31 outputs an inactive level of low. A binary output x of the comparison circuit 31 is integrated by the integration circuit 33 for every one current supply cycle T set by the clock φ. The integration circuit 33 integrates a high level output period of the foregoing voltage comparison circuit 31. Thus, when the output voltage Vo falls below the reference voltage Vr, the comparison circuit 31 outputs a level a in accordance with the period (Vo<Vr). This level a is reset to zero for every one current supply cycle T.

The single pulse with-variable-width generator 34 is a type of monostable multivibrator (so-called monomulti) which generates one pulse for every trigger, and a pulse width of the generated pulse signal Vp is variably controlled by an integration output Sx of the foregoing integration circuit 33. This single pulse with-variable-width generator 34 is triggered on the leading edge of the clock φ, whereby the single pulse with-variable-width generator 34 generates the pulse signal Vp for every one current supply cycle T, the pulse signal having a pulse width in accordance with the level a of the foregoing integration output Sx. As a current supply control signal, this pulse signal Vp is inputted to the control terminal (gate electrode) of the power MOS transistor Q1 which switches the input current. Thus, the current supply time t1 is variably set for every current supply time T independently.

Figure 4A:
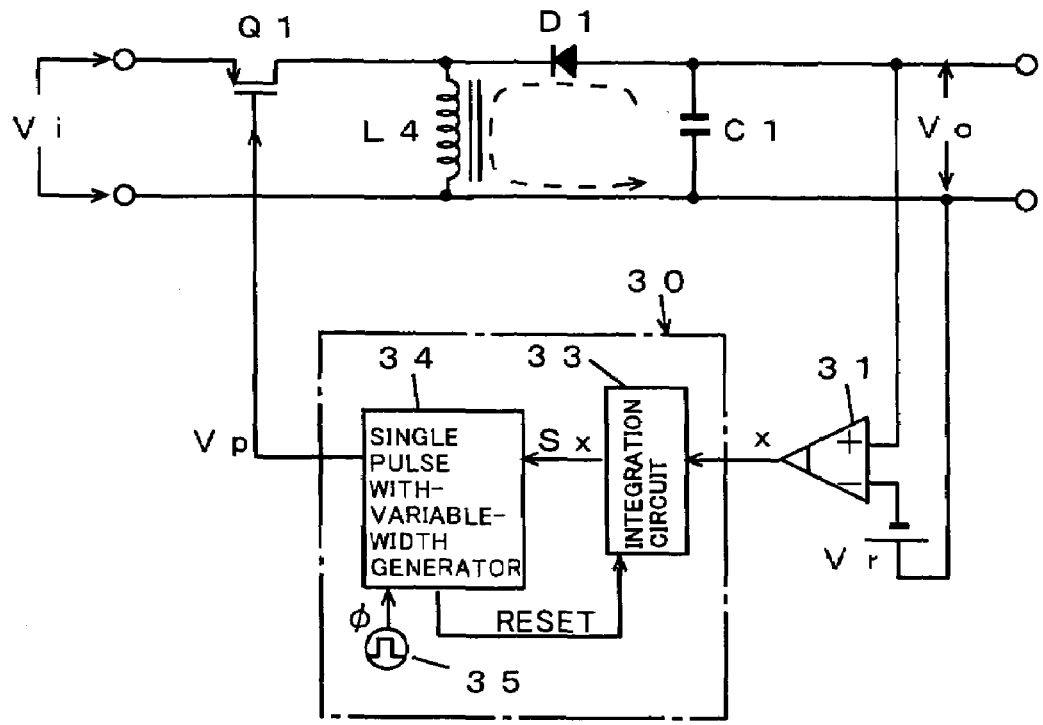
FIGS. 4A and 4B are a circuit diagram illustrating a third embodiment of the switching power supply circuit according to the present invention and a waveform chart of an operation of the same.
Figure 4B:
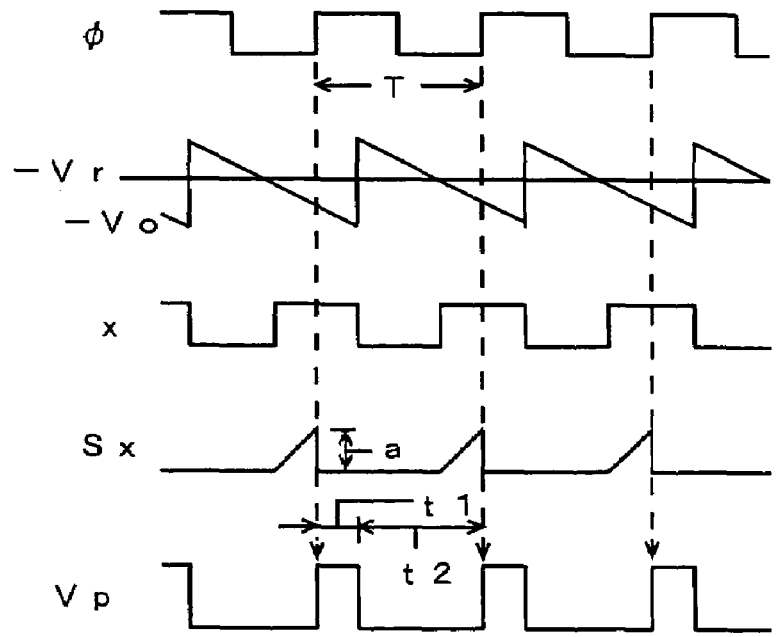

FIGS. 4A and 4B show a third embodiment of the present invention. Respectively, FIG. 4A shows a circuit diagram of a principal part thereof, and FIG. 4B shows a waveform chart of an operation thereof.

A switching power supply circuit of the third embodiment is constituted so that while an input current, which is supplied thereto at the time when a power MOS transistor Q1 is made to be turned on, is accumulated in a coil L4, an inertial current (shown by the dotted line with arrow) flowing through the coil L4 at the time when the transistor is made to be turned off is rectified by a diode D1 to be charged in a capacitor C1, whereby an output voltage Vo is taken out from the capacitor C1. A so-called back converter-type switching power supply circuit is constituted.

In this embodiment, as in the case of the foregoing second embodiment, a current supply time t1 of each current supply cycle T is variably set with use of a voltage comparison circuit 31 which outputs a difference between an output voltage Vo and a reference voltage Vr in the form of a binary logic level of high and low levels; an integration circuit 33 which integrates a period when a binary output x of the voltage comparison circuit 31 becomes high in level (−Vo<−Vr); and a single pulse with-variable-width generator 34 in which a pulse width of a generated pulse signal Vp is variably set by an output Sx of the integration circuit 33.

In this case, the foregoing integration circuit 33 integrates the binary output x during the period until a current supply in response to a next pulse signal is started after the binary output x of the voltage comparison circuit 31 becomes high in level. Then, an immediately following pulse supply time t1 is variably set based on the integration result (level a) for this period.

Figure 5A:
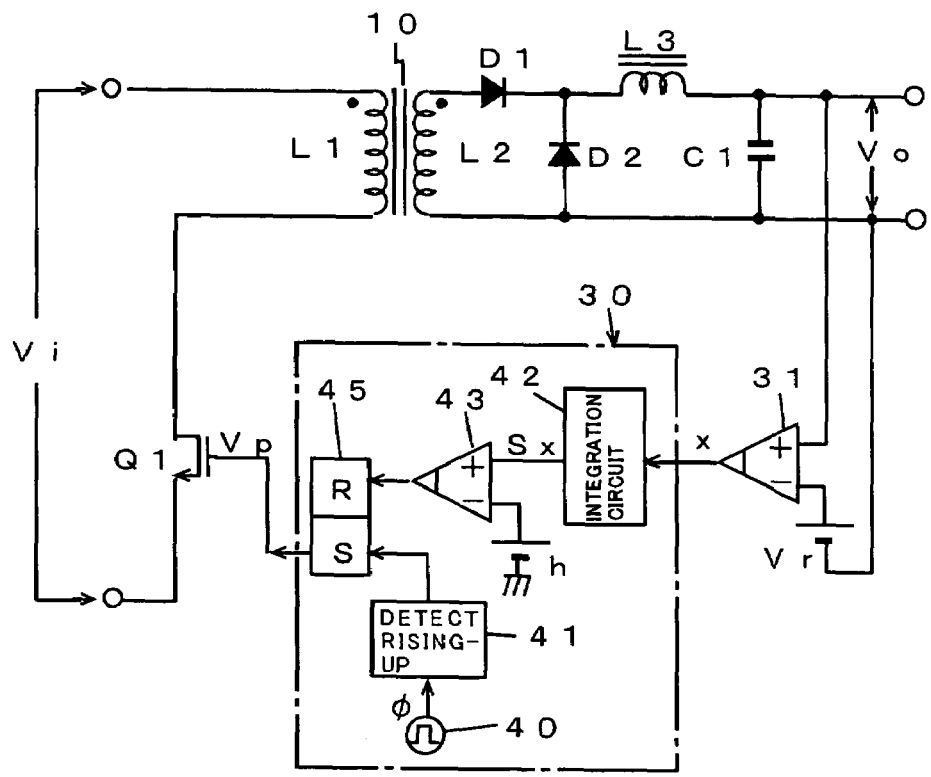
FIGS. 5A and 5B are a circuit diagram illustrating a fourth embodiment of the switching power supply circuit according to the present invention and a waveform chart of an operation of the same.
Figure 5B:
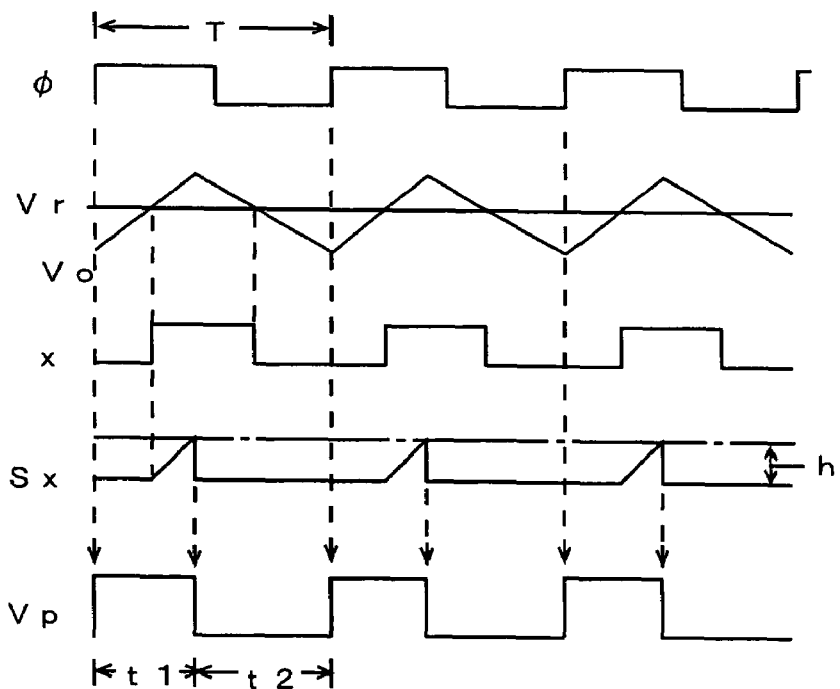

FIGS. 5A and 5B show a fourth embodiment of the present invention. Respectively, FIG. 5A shows a circuit diagram of a principal part thereof, and FIG. 5B shows a waveform chart of an operation thereof.

A switching power supply circuit of the fourth embodiment is constituted so that a current switched by a power MOS transistor Q1 is supplied to a primary coil L1 of a high frequency power transformer 10, and a current appearing at a secondary coil L2 of the transformer 10 is rectified and smoothened with use of a diode D1, a choke coil L3 and a capacitor C1.

In this embodiment, a current supply time t1 is variably set for every current supply cycle T with use of a first voltage comparison circuit 31 which outputs a difference between an output voltage Vo and a reference voltage Vr in the form of a binary logic level of high and low levels; a clock generator 40 which generates a clock φ of a constant cycle; an edge detection circuit 41 which detects a rising-up timing of the clock φ; a second voltage comparison circuit 43 which outputs a binary output; and a latching circuit 45 composed of a set/reset-type flip-flop.

In this case, the first voltage comparison circuit 31 outputs a high level output for a period (Vo>Vr) when an output voltage Vo is equal to or higher than a reference voltage Vr. The edge detection circuit 41 detects the rising-up edge of the clock φ, and sets the latching circuit 45 to a set-state. The integration circuit 42 integrates an output x of the first voltage comparison circuit 31. The second voltage comparison circuit 43 allows the foregoing latching circuit 45 to be restored to a reset-state when an integration output Sx of the foregoing integration circuit 43 reaches a predetermined level h. The set-state of the latching circuit 45 is given to a control terminal (gate electrode) of the foregoing transistor Q1 as a current supply control pulse signal Vp. Thus, the transistor Q1 is turned on at a cycle of the clock φ, so that the transistor Q1 performs a switching current supply and a current supply time t1 can be variably set respectively for every current supply cycle T independently.

Figure 6:
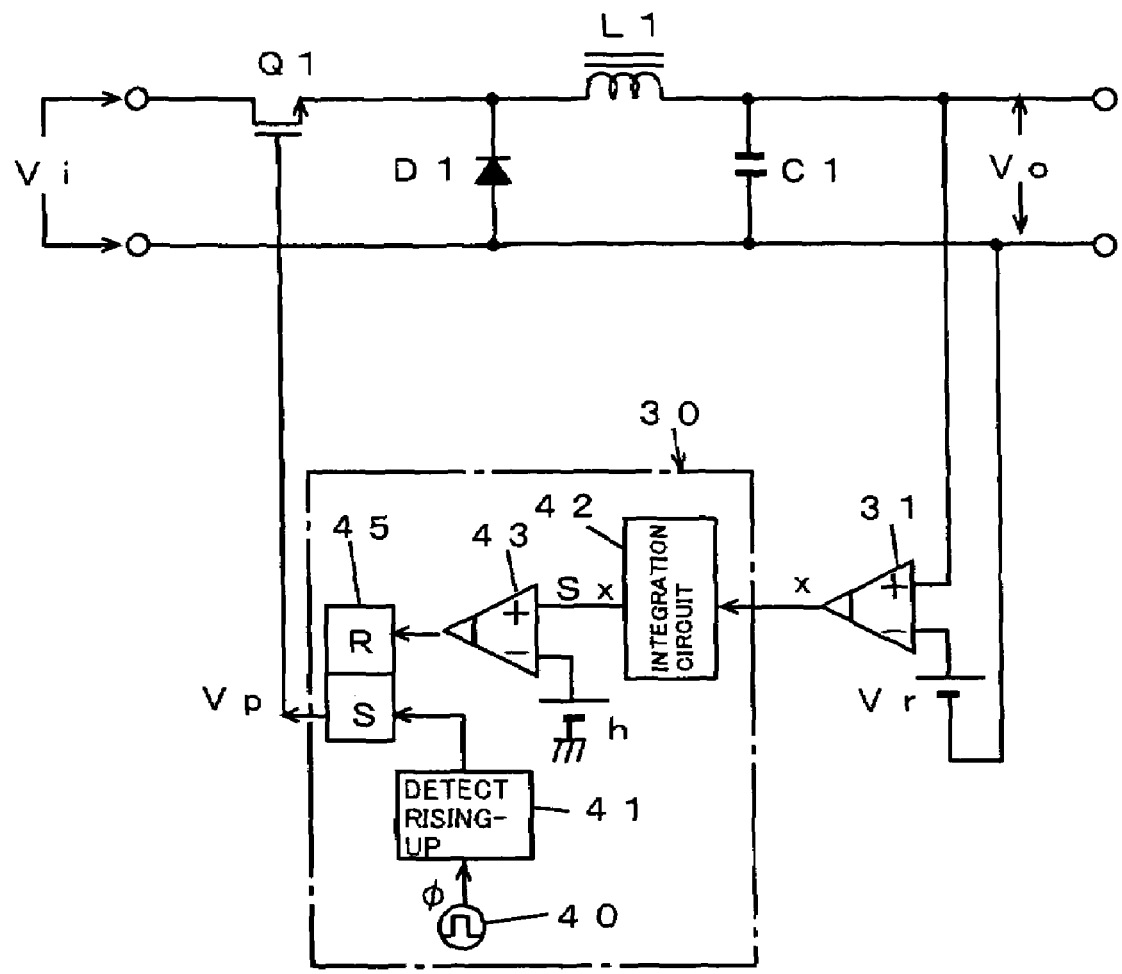
FIG. 6 is a circuit diagram illustrating a fifth embodiment of the switching power supply circuit according to the present invention.

FIG. 6 shows a fifth embodiment of the present invention. This embodiment shows an example in which the control circuit of the foregoing fourth embodiment is applied to the foregoing back converter-type switching power supply circuit system (third embodiment).

Figure 7A:
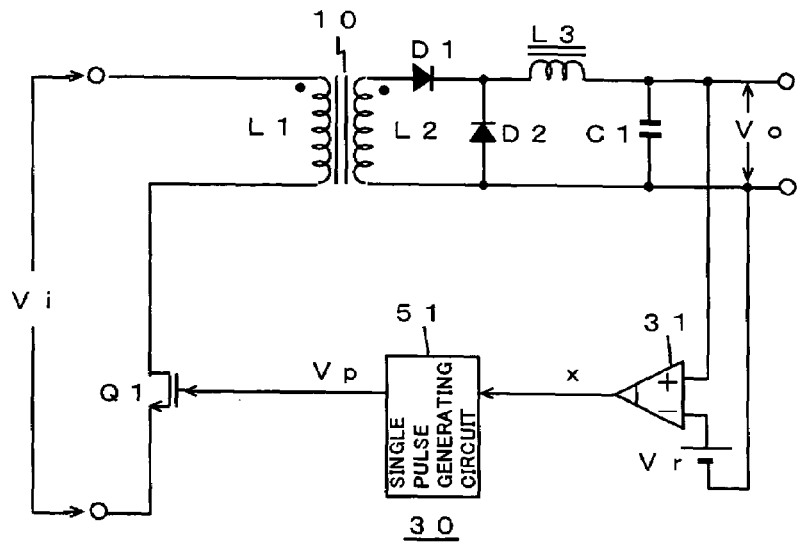
FIGS. 7A and 7B are a circuit diagram illustrating a sixth embodiment of the switching power supply circuit according to the present invention and a waveform chart of an operation of the same.
Figure 7B:
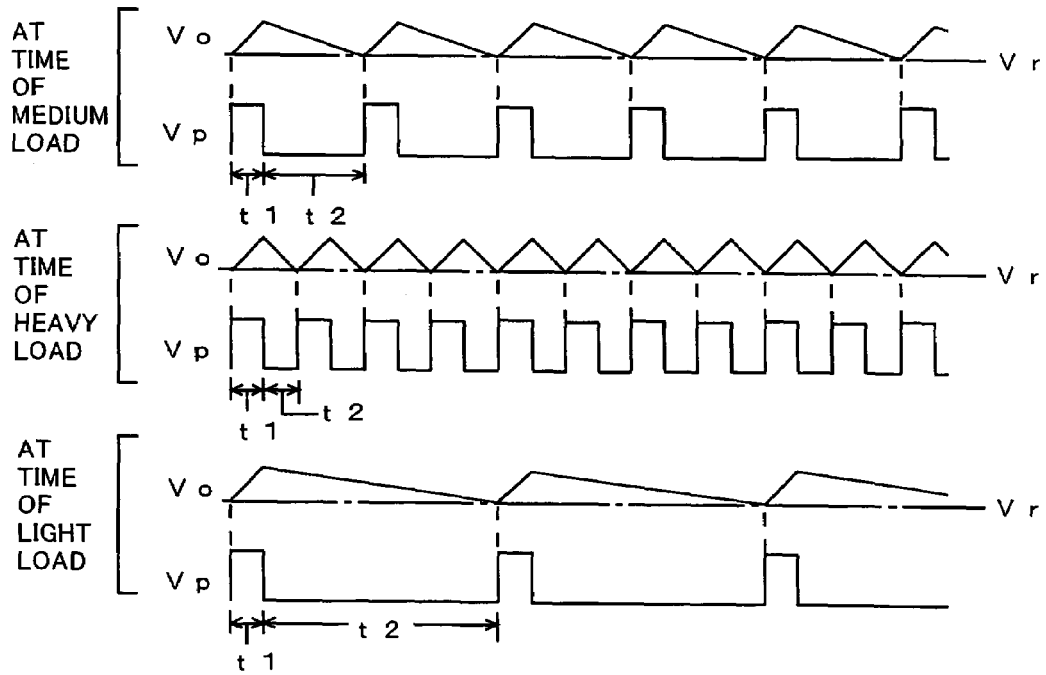

FIGS. 7A and 7B show a sixth embodiment of the present invention. Respectively, FIG. 7A shows a circuit diagram of a principal part thereof, and FIG. 7B shows a waveform chart of an operation thereof.

In this embodiment, a single pulse generating circuit 51 is used as the foregoing one-cycle current supply control circuit 30. This single pulse generating circuit 51 is a monostable multivibrator which generates a pulse signal Vp having a constant pulse width by being triggered, and is triggered every time an output voltage Vo falls below a reference voltage Vr. Thus, while a generation interval of the pulse signal Vp is narrowed at the time of a heavy load and a current supply time ratio (t1/t2) showing a ratio of a turning-on time of the transistor Q1 to a turning-off time thereof increases, the generation interval of the pulse signal Vp is widened at the time of a light load and the current supply ratio (t1/t2) decreases. As a result, the output voltage Vo is controlled so as to be converged to the reference voltage Vr.

In this case, although the pulse width of each pulse signal Vp does not change substantially, the same effect as that obtained by variably setting the current supply time t1 for every current supply cycle T independently can be achieved by making a generation frequency of the pulse signal Vp high.

Figure 8:
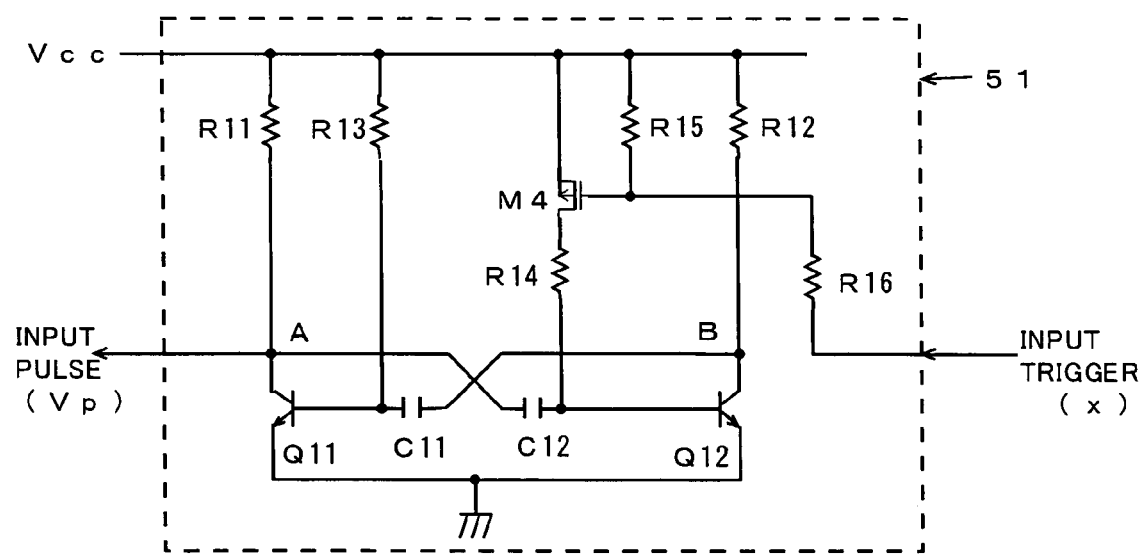
FIG. 8 is a concrete circuit diagram of a single pulse generating circuit used in the present invention.

FIG. 8 shows an exemplary circuit of the foregoing single pulse generating circuit 51. The circuit 51 shown in FIG. 8 is constituted by bipolar transistors Q11 and Q12, a p channel MOS transistor M4, capacitors (capacitive element) C11 and C12 and resistors R11 to R16.

In FIG. 8, respective collectors A and B of the bipolar transistors Q11 and Q12 are respectively connected to a power supply potential Vcc via the resistors R11 and R12. The base of one transistor Q11 is connected to the collector B of the other transistor Q12 via the capacitor C11, and the base of the other transistor Q12 is connected to the collector A of one transistor Q11 via the capacitor C12.

The base of one transistor Q11 is biased to the power supply potential Vcc side via a resistor R13, and the base of the other transistor Q12 is connected to the power supply potential Vcc in series via a resistor R14 and a MOS transistor M4 respectively. A gate of the MOS transistor M4 is biased to the power supply potential Vcc side via the resistor R15, and a trigger signal (x) is to be inputted to the gate of the MOS transistor M4 via the resistor R16.

In FIG. 8, when no input is applied to the gate of the MOS transistor M4 and the gate of the MOS transistor M4 is in an open-state, the MOS transistor M4 falls in an OFF-state. Thus, a base current is not supplied to the transistor Q12, and the transistor Q12 is in an OFF-state. On the other hand, the transistor Q11 is in an ON-state by a base current supplied via the resistor R13. Thus, in a static state where a trigger signal is not inputted, one transistor Q11 is in an ON-state, and the other transistor Q12 is in an OFF-state. At this time, the collector A of the transistor Q11 is kept to be low in level.

Herein, when the MOS transistor M4 is made to be in an ON-state temporarily by inputting the trigger signal, a base current is supplied to the transistor Q12 from the transistor M4 via the resistor R14. Thus, the transistor Q12 is turned on to be driven. When the transistor Q12 is once turned on, a base potential of the transistor Q11 is made to be closer to a low level via the capacitor C11, and the transistor Q11 is switched from the ON-state to the OFF-state. When the transistor Q11 is turned off, a base current comes to be supplied to the transistor Q12 from the collector A of the transistor Q11 through the capacitor C12, and the turning-on of the transistor Q12 and the turning-off of the transistor Q11 are accelerated. As a result, the collector A of the transistor Q11 is instantaneously risen up from its low level to its high level.

However, thereafter, since the capacitor C11 is charged via the resistor R13, a supply of the base current to the transistor Q11 is resumed after a predetermined time has elapsed. With the supply of the base current, the transistor Q11 is restored from the ON-state to the OFF-state, so that the transistor Q12 comes to be reverse-biased from the collector A of the transistor Q11 via the capacitor C12, and the transistor Q12 is restored from the ON-state to the OFF-state. Specifically, contrary to the above, the turning-off of the transistor Q12 and the turning-on of the transistor Q11 are accelerated, and the collector A of the transistor Q11 is restored to the original static state where the collector A thereof becomes low in level.

In the above described manner, the pulse signal Vp having a constant pulse width set by a time constant determined by the capacitors C11 and C12 and the like is outputted from the collector A of one transistor Q11 by inputting the trigger signal allowing the MOS transistor M4 to be turned on temporarily.

Figure 9A:
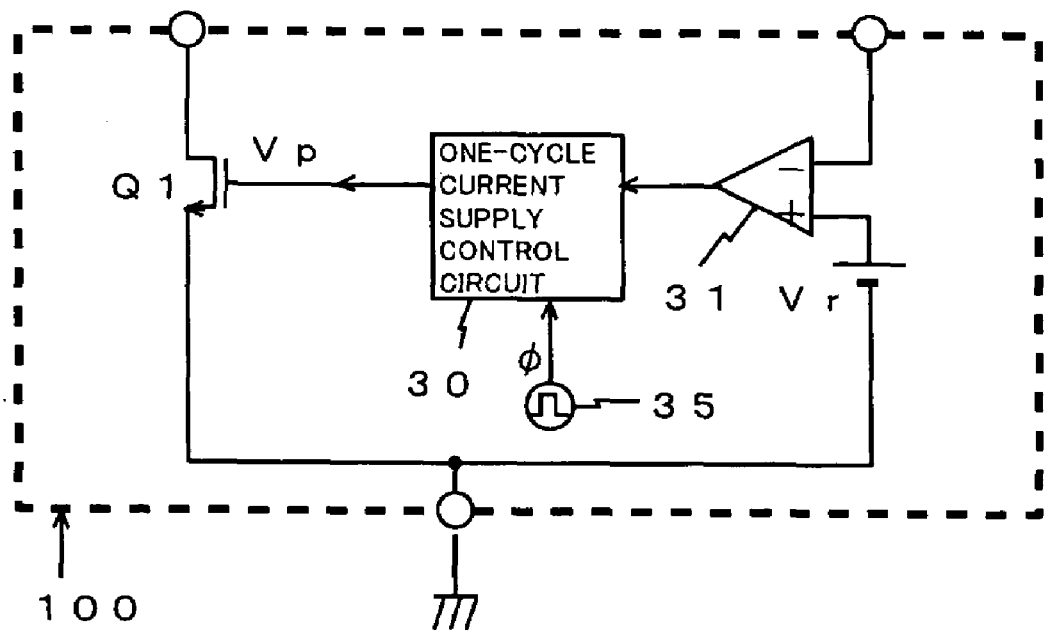
FIGS. 9A and 9B are equivalent circuit diagram illustrating a configuration example of a semiconductor integrated circuit device according to the present invention.
Figure 9B:
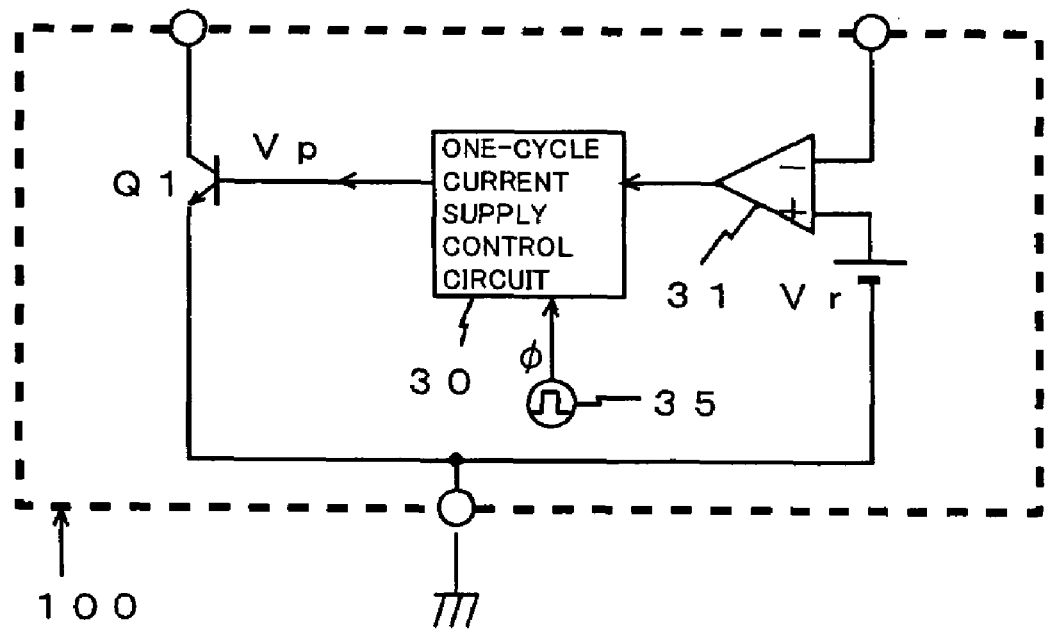
Figure 10A:
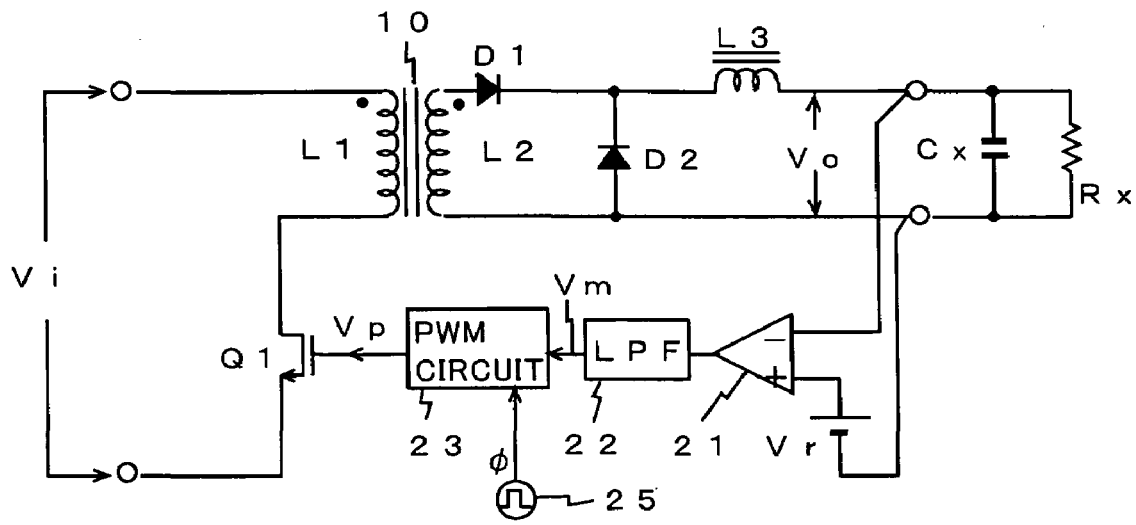
FIGS. 10A and 10B are a circuit diagram illustrating a configuration example of a conventional switching power supply circuit and a waveform chart of an operation of the same.
Figure 10B:
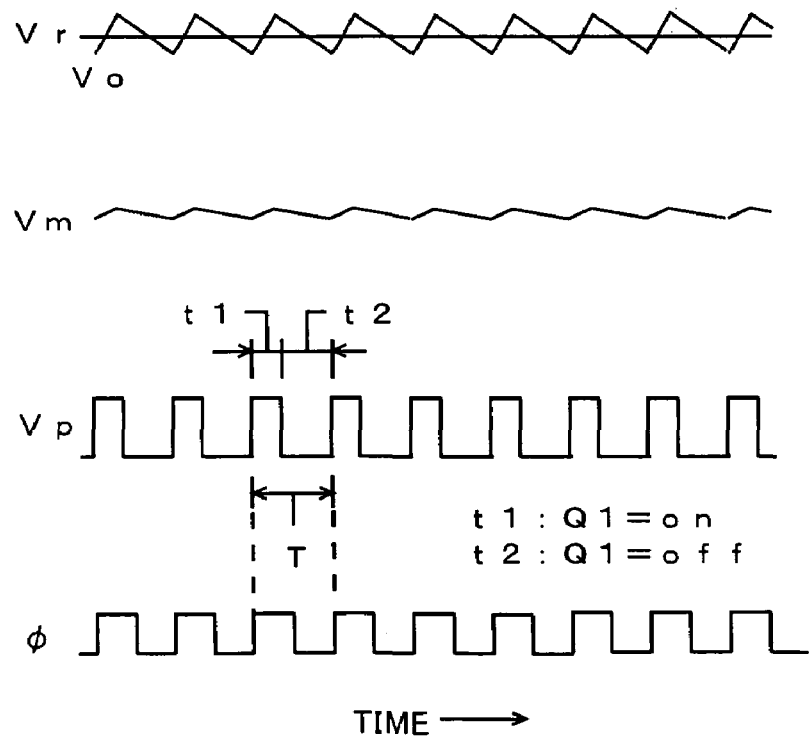

FIGS. 9A and 9B show an example of a semiconductor integrated circuit device according to the present invention.

As shown in FIGS. 9A and 9B, as a principal part of the switching power supply circuit according to the present invention, a power transistor Q1 for periodically switching an input current and at least a part of a control circuit (30, 31, 35 and the like) for controlling an ON/OFF time ratio of the transistor Q1 for every current supply cycle independently can be integrally formed on a single semiconductor substrate.

FIG. 9A shows an equivalent circuit of a semiconductor device 100 in which the MOS-type power transistor Q1 is formed, and FIG. 9B shows an equivalent circuit of a semiconductor device 100 in which the bipolar-type power transistor Q1 is formed. Since a MOS transistor can generally reduce a saturation voltage or a voltage drop between a drain and a source, voltage loss due to switching can be lessened by using the MOS transistor. Furthermore, since a bipolar transistor uses both of electrons with positive charge and holes with negative charge as carriers carrying a current, an operation of the circuit using the bipolar transistor is generally performed at a high speed compared to the MOS transistor using any of the electrons and the holes, and the bipolar transistor is suitable for high-speed switching.

As described above, the present invention was described based on the representative embodiments, and the present invention can be carried out by various aspects other than the foregoing embodiment. For example, a part or entire of the control circuit including the one-cycle current supply control circuit 30 can also be constituted by using an IP (Intellectual Property) core such as a micro computer and a DSP (Digital Data Processing Unit).

According to the foregoing embodiments of the present invention as described above, in the switching power supply circuit which controls the output voltage supplied to the load to the predetermined target value by supplying the input current to the load while switching the input current periodically and by controlling variably the ON/OFF time ratio of the switching, it is possible to respond to the rapid and large change in the load quickly and stably and to ensure the power supply output having the predetermined voltage.

Although the preferred embodiment of the present invention has been described in detail, it should be understood that various changes, substitutions and alternations can be made therein without departing from spirit and scope of the inventions as defined by the appended claims.

What is claimed is:

1. A switching power supply circuit which supplies an input current to a load while switching the input current periodically and controls an output voltage supplied to the load to a predetermined target value by controlling an ON/OFF time ratio of the switching, the switching power supply circuit comprising:
a circuit performing a control of the ON/OFF time ratio for every one current supply cycle independently, wherein the control of the ON/OFF time ratio is performed based on a difference between the output voltage and a reference voltage immediately before each ON period starts.

2. The switching power supply circuit according to claim 1, wherein a control error detected for an OFF period of the switching is integrated, and an ON period after an OFF period is variably set based on an integration result.

3. The switching power supply circuit according to claim 1, comprising a single pulse with-variable-width generator generating a pulse signal for every current supply cycle and variably sets a pulse width of the generated pulse signal by control error information, in order to set an ON period of the switching variably.

4. The switching power supply circuit according to claim 2, wherein the integration is carried out during a period when a control value exceeds the target value, and a time when an integration value reaches a predetermined level is determined as an end timing of an ON period of the switching, whereby the ON period of the switching is variably set in accordance with a control error.

5. The switching power supply circuit according to claim 1, comprising a single pulse generating circuit generating a pulse signal having a constant pulse width by being triggered every time an output voltage as a control value falls below a predetermined reference voltage,
wherein a start timing of an ON period of the switching is controlled by the pulse signal generated by the single pulse generating circuit.

6. The switching power supply circuit according to claim 1, the switching power supply circuit switching the input current flowing through a primary coil of a transformer, and rectifying and smoothing a switching output current appearing at a secondary coil of the transformer by the switching of the input current, thus supplying the rectified and smoothened switching output current to the load.

7. The switching power supply circuit according to claim 6, wherein the transformer is a high frequency transformer.

8. The switching power supply circuit according to claim 1, the switching power supply circuit accumulating the input current supplied at the time of an ON time of the switching in a coil, and rectifying an inertia current of the coil flowing at the time of an OFF time of the switching to charge the rectified inertial current in a capacitor, thus taking out an output voltage from the capacitor.

9. The switching power supply circuit according to claim 8, wherein an ON period of the switching is variably set based on a control error detected for an OFF period of the switching immediately before the ON period thereof and at the time when the output voltage falls below a predetermined reference voltage.

10. The switching power supply circuit according to claim 1, wherein the switching is performed with use of a MOS transistor.

11. The switching power supply circuit according to claim 1, wherein the switching is performed with use of a bipolar transistor.

12. The switching power supply circuit according to claim 1, wherein a part or entire of a control circuit variably setting the ON/OFF time ratio of the switching is integrally formed on a single semiconductor substrate together with active elements performing the switching.

13. A semiconductor circuit device constituting a principal part of a switching power supply circuit comprising a circuit which supplies an input current to a load while switching the input current periodically, and controls an output voltage supplied to the load to a predetermined target value by variably controlling an ON/OFF time ratio of switching, thus performing a control of the ON/OFF time ratio for every one current supply cycle independently, wherein a switching element for switching the input current periodically and at least a part of a control circuit for controlling the ON/OFF time ratio of the switching element for every current supply cycle independently are integrally formed on a single semiconductor substrate.

14. The semiconductor circuit device according to claim 13, wherein a power MOS transistor is formed as the switching element.

15. The semiconductor circuit device according to claim 13, wherein a power bipolar transistor is formed as the switching element.

16. A switching power supply circuit, comprising:

a switching element for switching an input current periodically;

a driving circuit for ON/OFF driving the switching element; and a circuit for comparing an output voltage supplied to a load with a predetermined target value, and for independently controlling an ON/OFF time ratio of the driving circuit for every one current supply cycle based on a comparison result, wherein the control of the ON/OFF time ratio is performed based on a difference between the output voltaae and a reference voltage immediately before each ON period starts.

* * * * *